United States Patent [19]
Wolff

[11] Patent Number: 5,165,865
[45] Date of Patent: Nov. 24, 1992

[54] INTAKE NECK CONNECTION FOR A HYDRAULIC PUMP

[75] Inventor: Guenter Wolff, Schwieberdingen, Fed. Rep. of Germany

[73] Assignee: Robert Bosch GmbH, Stuttgart, Fed. Rep. of Germany

[21] Appl. No.: 671,331

[22] Filed: Mar. 19, 1991

[30] Foreign Application Priority Data

Apr. 11, 1990 [DE] Fed. Rep. of Germany ....... 4011668

[51] Int. Cl.⁵ ............................................. F04B 49/08
[52] U.S. Cl. ...................................... 417/310; 60/494
[58] Field of Search ................... 417/307, 310, 305; 91/432; 251/149, 149.8; 60/494; 285/305, 404

[56] References Cited

U.S. PATENT DOCUMENTS

| | | | |
|---|---|---|---|
| 1,818,097 | 8/1931 | Petrelli | 417/310 |
| 2,883,394 | 4/1959 | Roosa | 417/310 X |
| 2,977,888 | 4/1961 | Livermore | 417/310 X |
| 3,628,893 | 12/1971 | Carpigiani | 417/310 |
| 4,749,192 | 6/1988 | Howeth | 285/305 X |

FOREIGN PATENT DOCUMENTS 2345603 10/1977 France ...................... 417/310

Primary Examiner—Leonard E. Smith
Attorney, Agent, or Firm—Edwin E. Greigg; Ronald E. Greigg

[57] ABSTRACT

A detachable intake neck connection for a pump which prevents aspiration of air into the hydraulic pump if a suction line is missing. The hydraulic pump has a first neck bore that, communicates with a suction chamber, which tightly receives an intake hose nipple of a suction line. The pump has a second neck bore for a pressure line, this second bore communicates with a pressure chamber. A connecting bore 31 that communicates with the pressure chamber of the pump begins at the neck bore for the intake hose nipple and is tightly closed by the intake hose nipple introduced into the neck bore. If the intake hose nipple is missing, the pressure chamber of the pump is short-circuited to the suction chamber through the connecting bore. A buildup of pressure in the pump and hence pumping of air is therefore precluded, the hydraulic pump is usable for instance for hydraulic vehicle brake systems, in which for safety reasons, the aspiration of air into the brake system must be prevented.

9 Claims, 1 Drawing Sheet

5,165,865

INTAKE NECK CONNECTION FOR A HYDRAULIC PUMP

BACKGROUND OF THE INVENTION

The invention is based on an intake neck connection for a self-aspirating hydraulic pump, in particular a circulation pump or reciprocating positive-displacement pump for hydraulic vehicle brake systems, as defined hereinafter.

An intake neck connection of this kind is already known, in which the intake hose secured to the housing of the hydraulic pump, by means of a tappet attached to its connection nipple, keeps a check valve of the pump in the open position, so that the pump can aspirate brake fluid from a brake fluid supply tank through the intake hose. When the intake hose is separated from the pump housing, the check valve contrarily assumes its closing position. The pump cannot aspirate air through the consequently closed intake neck and pump it into the brake system. Air must be prevented from entering the brake system, for safety reasons.

OBJECT AND SUMMARY OF THE INVENTION

The intake neck connection according to the invention as defined herein has an advantage over the prior art in that the aspiration of air is reliably avoided even if the intake line is missing, without using moving parts of the pump, because the intake hose nipple removed from the connecting bore uncovers a short-circuit connection between the pressure side and the intake side of the pump, thus precluding a buildup of pressure with the pumping of air on the pressure side of the pump.

Other provisions set forth herein describe advantageous further features and embodiments of the intake neck connection.

The provision that a conduit embodied as a connecting bore is extended coaxially with the longitudinal axis of the neck bore for the intake hose nipple and discharges into the neck bore for the pressure line is advantageous, because the connecting bore can be produced at little expense, preferably in a single drilling operation, along with the neck bore for the pressure line.

An embodiment in which an intake hose nipple has a coaxially extending cylindrical tang, which engages a connecting bore to tightly closing it has an advantage that the intake hose nipple can be manufactured at favorable cost as a turned part along with its tang.

With a feature in which a sealing ring is received circumferentially in a tang of an intake hose nipple, reliable separation of the intake side and pressure side of the pump is attained.

The feature in which the intake hose nipple has an annular groove, which is engaged by a securing pin, such as a spring pin or the like, that is drivable into a pump housing is advantageous because with simple means, positional securing of the intake hose nipple and a diversion of hydraulic pressure forces acting upon the nipple and of tensile forces engaging the intake hose is attained.

With an arrangement in which a mouth of the neck bore for the intake hose nipple is located above the suction chamber and/or above the pressure chamber of the pump, better venting of the pump is attained, on the one hand, and on the other a loss of fluid when the intake hose is removed from the pump is also avoided.

With the embodiment in which an intake hose nipple has a longitudinal bore, which by means of a transverse bore communicates with a suction chamber of the pump; the longitudinal bore communicates with the pressure chamber through a coaxially extending continuous overflow bore of the tang; and a spring-loaded valve closing element engages an end of the hose the suction chamber of the overflow bore, a pressure limiting valve that can be produced in conjunction with the production of the intake hose nipple and is integrated with it is attained, which in contrast to the otherwise conventional disposition of such a valve in the pump housing is economical in terms of not only manufacture but also assembly and testing.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
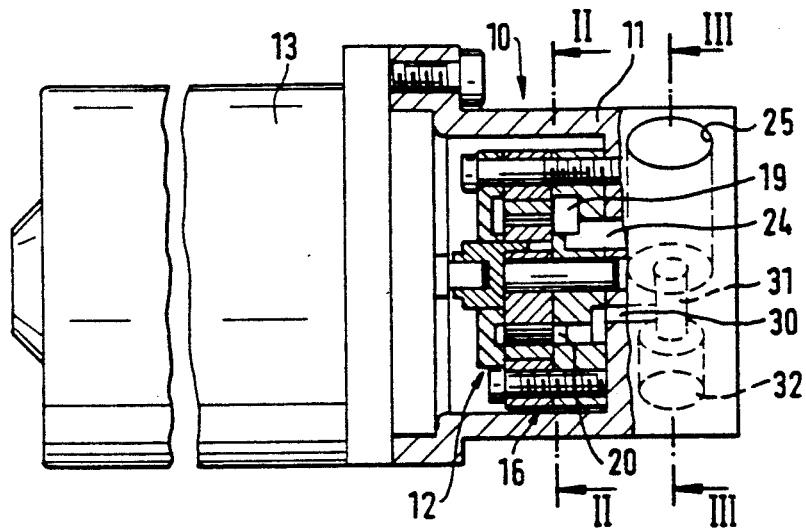
FIG. 1 shows a view of a self-aspirating hydraulic pump with a pump housing, shown partly cut away.

The self-aspirating hydraulic pump 10 shown in FIG. 1 has a pump housing 11, in which a gear pump 12 with teething on the inside is disposed. The gear pump 12, which is of the type known as circulating positive-displacement pumps is drivable by an electric drive motor 13 flanged to the pump housing 11.

Figure 2:
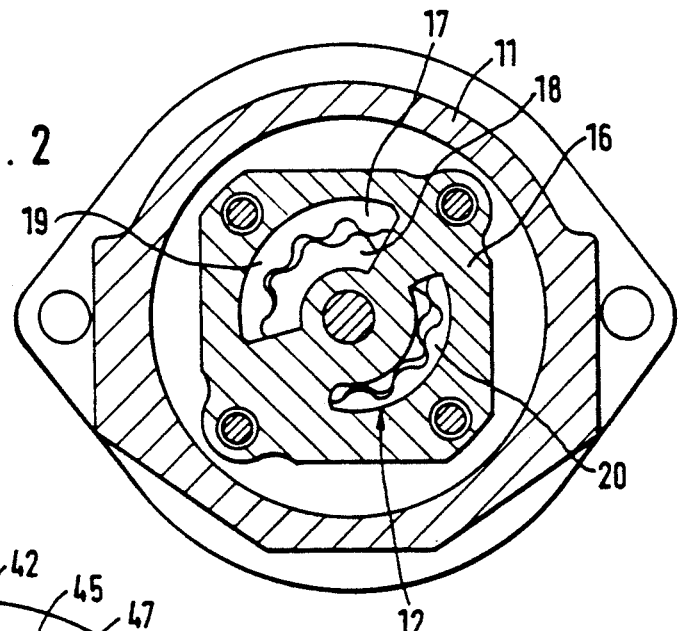
FIG. 2 is a cross section through the pump housing taken along the line II—II of FIG. 1, on a different scale, showing both the suction chamber and the pressure chamber of the pump.
Figure 3:
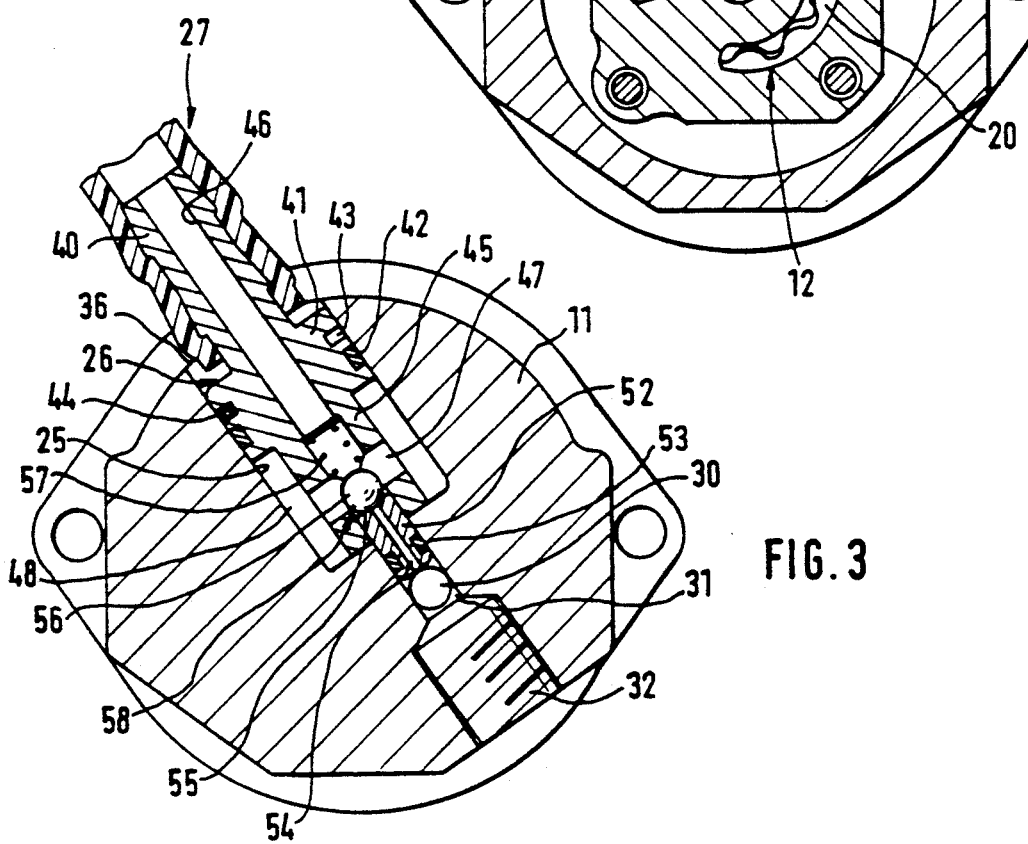
FIG. 3 is a section through the pump housing part along the line III—III of FIG. 1, again on a different scale, with an intake hose nipple received in the pump housing, which nipple blocks off a connecting bore between the suction chamber and the pressure chamber of the pump.

Disposed in the pump housing 11 is an inner housing 16 of the gear pump 12, which receives a toothed outer impeller 17 and a toothed inner impeller 18. The inner housing 16 encloses a kidney-shaped suction chamber 19 and a kidney-shaped pressure chamber 20 of the gear pump 12 (FIG. 2). From the suction chamber 19 of the gear pump 12, a suction bore 24 leads to a neck bore 25 of the pump housing 11 for receiving an intake hose nipple 26 of a suction line 27 for the operating fluid to be pumped by the hydraulic pump 10 (see FIG. 3). Contrarily, from the pressure chamber 20 of the gear pump 12, a pressure line 30 leads to a connecting bore 31 in the pump housing 11. The connecting bore 31 serves as a conduit between the neck bore 25 for the intake hose nipple 26 of the suction line and a neck bore 32 of the pump housing 11 for a pressure line, not shown. The neck bore 25, the connecting bore 31 and the neck bore 32 extend with the same longitudinal axis. In a departure from the exemplary embodiment shown, they may also be disposed in a connection plate the face end of which rests on the pump housing 11.

The neck bore 25 for the intake hose nipple 2 is embodied as smooth on the circumference and extends at an angle of approximately 60° to the horizontal plane, substantially above the longitudinal axis of the hydraulic pump 10. The mouth 36 of the neck bore 25 is therefore located above the suction chamber 19 and pressure chamber 20 of the gear pump 12.

The connecting bore 31, originating on the bottom at the neck bore 25 for the intake hose nipple 26, has a smaller diameter than the neck bore. The connecting bore 31 is axially defined b the neck bore 32 for the pressure line, which bore is located below the horizontal plane of the hydraulic pump 10. The pressure line 30 arriving from the pressure chamber 20 of the gear pump 12 discharges into the portion of the connecting bore 31 associated with the neck bore 32 for the pressure line.

The intake hose nipple 26 has a cylindrical portion 41, bordering on its sheath 40; this portion is seated fittingly in the neck bore 25 of the pump housing 11. The portion 41 of the intake hose nipple 26 is sealed off from the pump housing 11 by a circumferentially disposed sealing ring 42. An annular groove 43 is formed in the region toward the sheath of the portion 41, and the annular groove is engaged by a spring pin 44 driven into the pump housing 11 from the free face end thereof. This spring pin serves as a securing pin to prevent the intake hose nipple 26 from being unintentionally pulled out of the neck bore 25. The spring pin 4 also absorbs hydraulic forces acting upon the intake hose nipple 26.

The intake hose nipple 26 is extended in a portion 45 of recessed diameter. The sheath 40, the portion 41 of larger diameter, and the portion 45 of smaller diameter of the intake hose nipple 26 are penetrated by a coaxially extending longitudinal bore 46; this bore is intersected, in the portion 45 of the intake hose nipple 26, by a transverse bore 47, so that there is a fluid-carrying communication between the interior of the suction line 27 into the portion 48 of the neck bore 25 that is not completely filled by the portion 45 of the intake hose nipple 26. Located in FIG. 3 under the portion 45 of the intake hose nipple 26, the suction bore 24 leading into the suction chamber 19 of the gear pump 12 begins at the portion 48 of the neck bore 25.

The intake hose nipple 26 has a coaxially extending cylindrical tang 52, which fittingly engages the connecting bore 31 as far as the mouth of the pressure line 30. A sealing ring 53 for sealed closure of the connecting bore 31 is received in the tang 52 of the intake hose nipple 26. The tang 52 is introduced as a separate component into the longitudinal bore 46 of the intake hose nipple 26 and is welded to the portion 45 thereof. The tang 52 has a continuous overflow bore 54, extending coaxially with the longitudinal bore 46; the overflow bore, at its mouth near the transverse bore 47 toward the suction chamber, forms a valve seat 55 for a ball 56 acting as a valve closing element and movably disposed in the longitudinal bore 45. Under the influence of a compression spring 57 supported on the intake hose nipple 26 and disposed in the longitudinal bore 46, this ball 56 engages the valve seat 55. The valve seat 55, ball 56 and compression spring 57 form a pressure limiting valve 58 disposed between the pressure side and the intake side of the gear pump 12. If the pressure limiting valve is disposed as a separate component assembly in the pump housing 11, then in a departure from the exemplary embodiment described, the tang 52 can be embodied without a bore and can be integrally formed onto the intake hose nipple 26.

Operating fluid for the hydraulic pump 10 is aspirated into the suction chamber 19 of the gear pump 12 through the suction line 27, the longitudinal bore 46 and the transverse bore 47 of the intake hose nipple 26; the portion 48 of the neck bore 25 of the pump housing 11; and the suction bore 24 branching off from the neck bore 25. The operating fluid pumped by the outer impeller 17 and the inner impeller 18 of the gear pump 12 flows from the pressure chamber 20 through the pressure line 30 into the part of the connecting bore 3 that is free of the tang 52, to the neck bore 32 and into the pressure line (not shown). A communication between the neck bore 25 and the neck bore 32 of the pump housing 11 through the overflow bore 54 of the tang 52 is blocked by the pressure limiting valve 58 when it assumes its closing position. Only if there is an impermissibly great rise in pressure on the pressure side of the gear pump 12 does the pressure limiting valve 58 open, allowing operating fluid to be diverted through the overflow bore 54 into the neck bore 25 and to the intake side of the gear pump.

If it is necessary to disconnect the suction line 27 from the hydraulic pump 10, then the intake hose nipple 26 with its tang 52, pulled out of the neck bore 25, uncovers the connecting bore 31 between the neck bore 32 for the pressure line and the neck bore 25 for the intake hose nipple 26. If the hydraulic pump 10 is put into operation with the suction line 27 improperly not re-attached, then because of the conduit through the connecting bore 31, which forms a short-circuit between the pressure side and the intake side of the gear pump 12, no pressure can build up in the pressure chamber 20 of the gear pump 12. This means that the gear pump is unable to pump operating fluid and hence is unable to aspirate air from the intake side. This precludes the danger of pumping air into the pressure line.

If the hydraulic pump 10 is used in a hydraulic vehicle brake system, this assures that if the intake line is missing while the pump is switched on, air will not be pumped into the brake system.

In a departure from the exemplary embodiment described, the invention is also usable in other hydraulic circulating or reciprocating positive-displacement pumps, as long as they are of the self-aspirating type.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A detachable intake neck connection for a self-aspirating hydraulic pump (10), for hydraulic vehicle brake systems, having a pump housing (11), a first neck bore (25) disposed in said pump housing (11), said first neck bore (25) communicates with a suction chamber (19) of the pump, said first neck bore (25) tightly receives one end of an intake hose nipple (26) of a suction line (27), a second neck bore (32) of the pump housing communicates with a pressure chamber (20) of the pump, a conduit embodied as a connecting bore (31) begins at the first neck bore (25) and extends coaxially with a longitudinal axis of the first neck bore (25) and discharges into said second neck bore (32) which communicates with the pressure chamber (20) of the pump (10), said intake hose nipple (26) received in said first neck bore (25) has a coaxially extending cylindrical tang (52), which engages the connecting bore (31) to tightly close said connecting bore (31) to prevent a flow of fluid therethrough.

2. An intake neck connection as defined by claim 1, in which a sealing ring (53) is received circumferentially in the tang (52) of the intake hose nipple (26).

3. An intake neck connection as defined by claim 1, in which said intake hose nipple (26) has a longitudinal bore (46), which by means of a transverse bore (47) communicates with the suction chamber (19) of the pump (10); that the longitudinal bore (46) communicates with the pressure chamber (20) through a coaxially extending continuous overflow bore (54) of the tang (52); and that a spring-loaded valve closing element (ball 56) engages an end of said tang toward the suction chamber of the overflow bore (54).

4. A detachable intake neck connection for a self-aspirating hydraulic pump (10), for hydraulic vehicle brake systems, having a pump housing, a first neck bore (25) disposed in said pump housing (11), said first neck bore communicates with a suction chamber (19) of the pump, said first neck bore (25) tightly receives one end of an intake hose nipple (26) of a suction line (27), a second neck bore (32) of the pump housing communicates with a pressure chamber (20) of the pump via a pressure line (30), a conduit (31) begins at the first neck bore (25) and communicates with the pressure chamber (20) of the pump (10) via the second neck bore (32), and the first neck bore (25) for the intake hose nipple (26) is tightly closed by introduction of the intake hose nipple (26) into the first neck bore (25) and introduction of said intake hose, nipple into said neck bore (25) simultaneously tightly closes said connecting bore (31).

5. An intake neck connection as defined by claim 4, in which said conduit (31) is embodied as a connecting bore extending coaxially with a longitudinal axis of the first neck bore (25) which receives the intake hose nipple (26) and which discharges into said second neck bore (32) for the pressure line.

6. An intake neck connection as defined in claim 4, in which said intake hose nipple (26) has an annular groove (43), which is engaged by a securing pin that is drivable into the pump housing (11).

7. An intake neck connection as defined in claim 4, in which said first neck bore (25) includes a mouth (36) and said mouth (36) of said first neck bore (25) for the intake hose nipple (26) is located above the suction chamber (19) and above the pressure chamber (20) of the pump (10).

8. An intake neck connection as defined in claim 4, in which said first neck bore (25) includes a mouth (36) and said mouth (36) of said first neck bore (25) for the intake hose nipple (26) is located above the suction chamber (19) of the pump (10).

9. An intake neck connection as defined in claim 4, in which said first neck bore (25) includes a mouth (36) and said mouth (36) of said first neck bore (25) for the intake hose nipple (26) is located above the pressure chamber (20) of the pump (10).

* * * * *